Patented May 22, 1928.

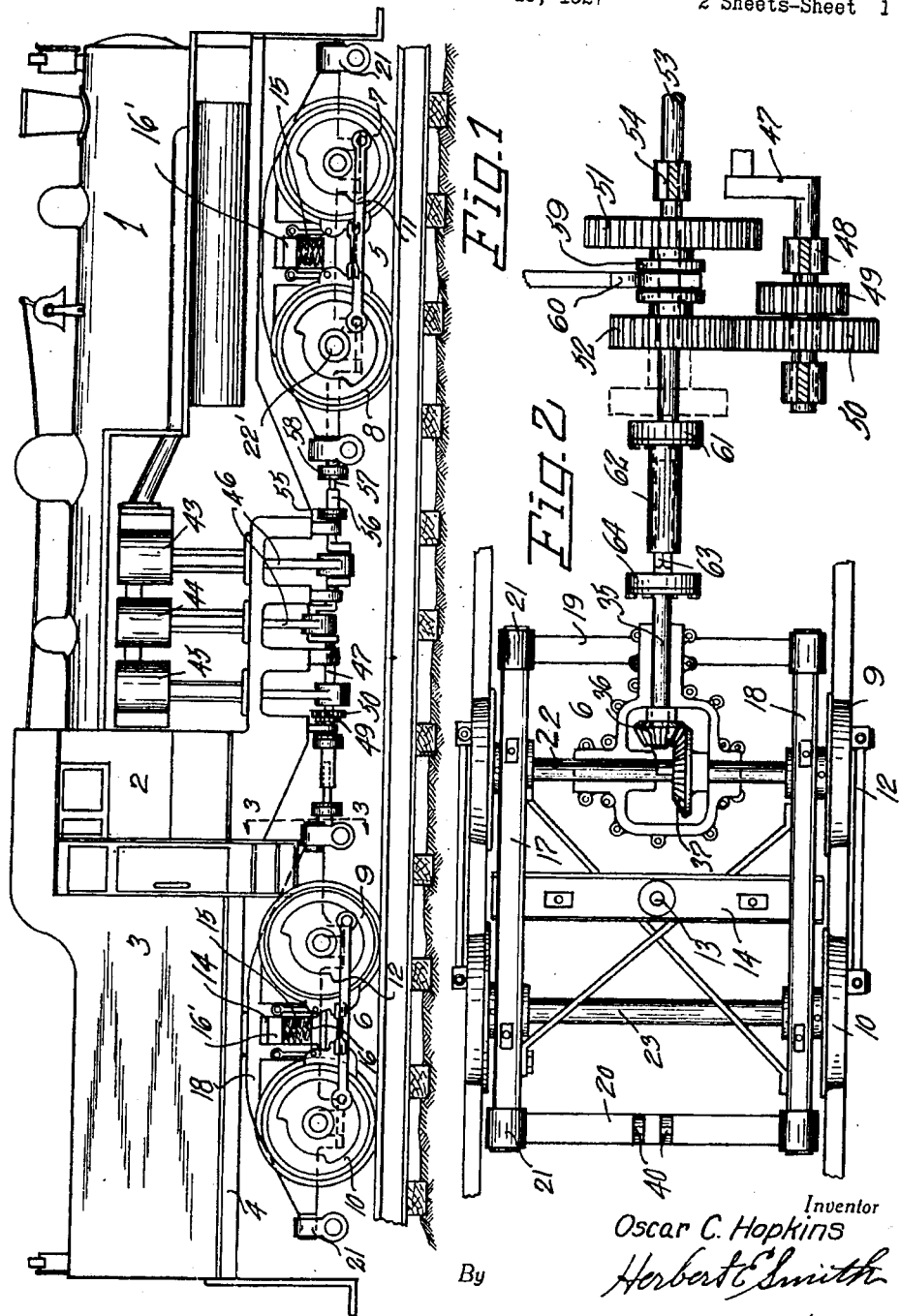

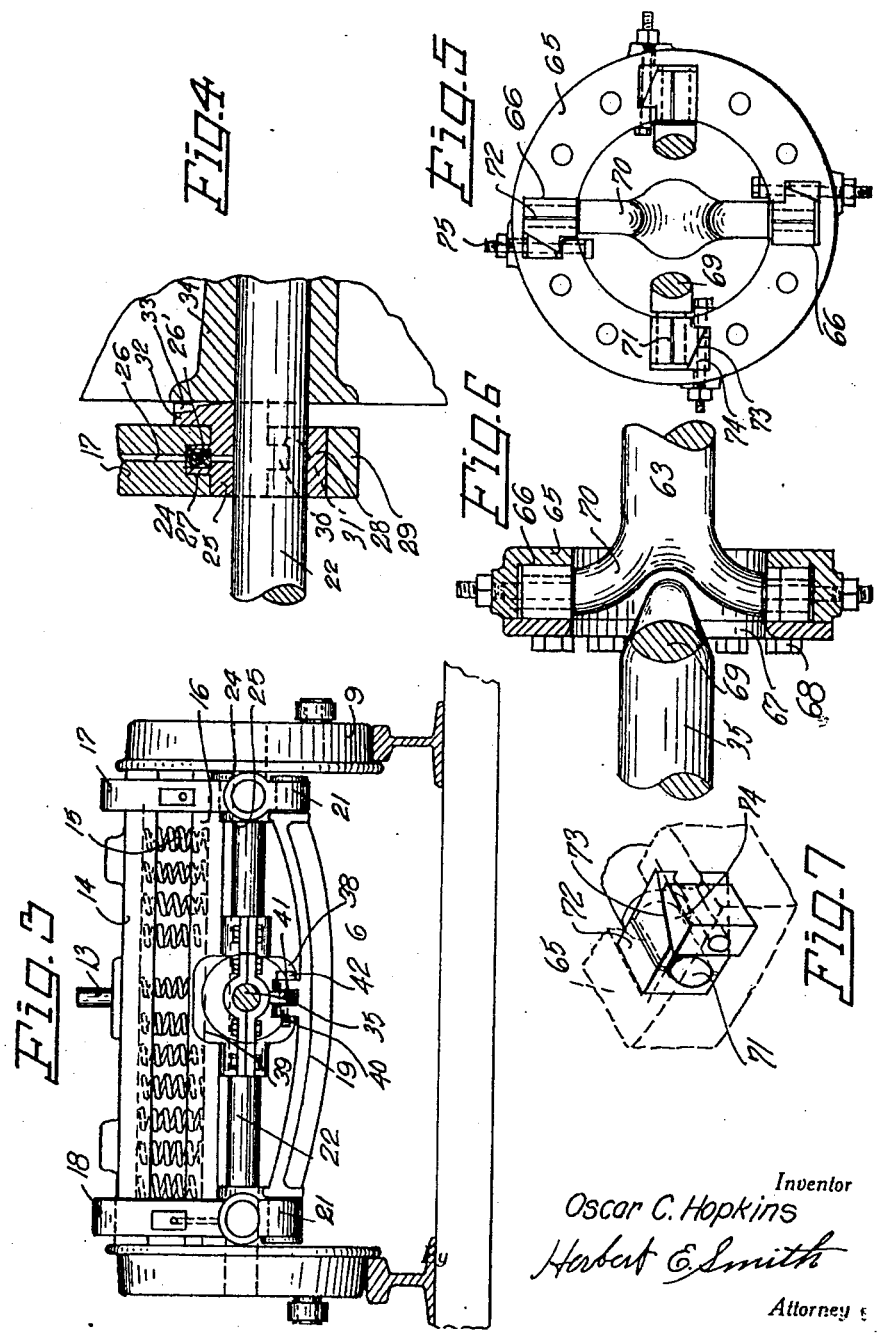

1,670,624

UNITED STATES PATENT OFFICE.

OSCAR C. HOPKINS, OF ENAVILLE, IDAHO.

GEARED LOCOMOTIVE.

Application filed February 15, 1927. Serial No. 168,325.

My present invention relates to improvements in geared locomotives of the Shay type that are especially designed for tractive force and power at slow speed, and applicable for use on steep grades and sharp turns or curves with small radius on railways. In carrying out the principles of my invention the locomotive is equipped with a pair of four wheel trucks, and the wheels, in pairs, at the sides of the trucks are coupled together by the usual connecting rod. A plurality of engines, of the vertical type are employed to operate a crank shaft, and power is transmitted to a longitudinally disposed, centrally arranged, flexible jackshaft and by means of the jack shaft power is transmitted to a driving axle of each of the front and rear trucks of the locomotive.

As is well known this type of locomotive is subjected to excessive wear of its operating parts, which require frequent replacements due to friction on account of the steep grades and sharp curves on the railroad employing such locomotives. By the utilization of the novel combinations and arrangements of parts involved in the locomotive as improved by me the drive mechanism, transmission mechanism and gearing, as well as the construction of the trucks, are adapted to render the required flexibility for a smooth running locomotive in which the friction to a maximum degree is eliminated.

The invention consists in certain novel combinations and arrangements of parts as will hereinafter be more fully pointed out and claimed.

In the accompanying drawings I have illustrated one complete example of the physical embodiment of my invention wherein the parts are combined and arranged according to the best mode I have thus far devised for the practical application of the principles of my invention.

Figure 1 is a view in side elevation of a geared locomotive involving the features of my invention.

Figure 2 is a plan view showing one of the trucks (the rear one) and a portion of the driving and transmission mechanism for imparting power to the wheels of the truck, it being understood that the front truck is supplied with power in like manner.

Figure 3 is an end view of the rear truck as at line 3—3 of Figure 1.

Figure 4 is an enlarged detail sectional view showing the lubrication means for the journal bearings of the truck wheels.

Figure 5 is a transverse sectional view at one of the universal joints of the driven, sectional, transmission shaft supplying power from the crank shaft to the driving axles of the front and rear trucks.

Figure 6 is a longitudinal detail sectional view of one of the universal joints in the flexible transmission shaft.

Figure 7 is a detail perspective view showing one of the adjustable bearing blocks of the universal joints.

In order that the general assembly and relation of parts may readily be understood I have shown in Figure 1 a locomotive equipped according to my invention and provided with the usual steam boiler 1, cab 2 and fuel and water compartment 3, these parts being illustrated in conventional style and supported from the steel girder or underframe 4 of the locomotive. The locomotive is supported on a pair of four-wheel trucks as 5 and 6 which are of substantially similar construction and adapted for use as the driving power of the locomotive. Each truck is provided with two pairs of wheels 7 and 8 and 9 and 10 and the pairs of wheels of the front truck are coupled together by connecting rods 11 while the wheels of the pairs on the rear truck are coupled together by connecting rods 12. The wheels 8 at the opposite sides of the front truck and the wheels 9 at the opposite sides of the rear truck are used as the drivers of the respective trucks, and of course the connecting rods transmit power to the other wheels of the trucks in order that the maximum tractive force may be employed. The truck wheels are counterbalanced as usual, and flanged, and the truck frames are provided with a flexibility that compensates for the flanging of all of the traction wheels.

Each truck is provided with a king or pivot pin 13 that co-acts with suitable parts on the underframe 4 of the locomotive and the pivot pins are carried at the longitudinal center line of the locomotive on the transverse bolsters 14 of the trucks. These bolsters 14 are resiliently supported by springs 15 and the bottom bolster 16, the latter arranged parallel with and below the resilient bolster 14, and the latter is guided in its vertical movement in vertical slots 16' of the truck side-frames 17 and 18. The side frames which extend longitudinally of the locomotive, are arched and as seen in Figures 1 and 2 are located within the wheel space of the trucks and connected at their ends by the downwardly arched bolsters 19 and 20. The side frames at their ends and the end bolsters 19 and 20 are connected by the employment of double shackles or yokes 21 each of which comprises a pair of bearing sleeves with their axes extending on lines at right angles to one another and these sleeves receive the journal ends of the side frames and of the end bolsters, to provide for the required flexibility at the front and rear ends of the truck frame.

The driving axle for each truck is designated 22 and the driven axle of each truck is indicated as 23, and each axle has a journal end 24 with a special type of bearing for supporting the locomotive on these axles. As seen in Figure 4 the bearing comprises an upper block 25 having an oil or lubricant duct 26 through which oil may flow, from an oil or lubricant cup attached to the side frame as at 27, and then through hole 26' to the journal. The lower bearing block 28 rests upon the supporting plate 29 of the side frame, and these upper and lower bearing blocks are interlocked by means of depending lugs 30 on the upper block that fit into complementary mortises or slots 31 on the lower block, the whole being bolted in position in the side frames.

As there is developed a great amount of friction between the wheels and the side frames of bearing members of the side frames, due to the relative movement of the wheels and side frames of the trucks on grades and curves, I provide additional lubricating means as indicated in Figure 4 which comprise a semi-circular flange 32 having an oil distributing channel 33 to lubricate the outer vertical face of the wheel hub 34. This flange 32 is integral with the upper bearing block and is located at the inner side of the side frame between the latter and the wheel hub, and it will be apparent that the oil is distributed between the flange and hub to reduce friction between these parts caused by relative movement of the wheels and side frames. It will be understood of course that all of the wheel-hubs are thus lubricated.

Each truck is provided with a section as 35 of the flexible transmission shaft which is located along the longitudinal axis of the locomotive to insure a minimum flexing or lateral movement of the transmission shaft as the locomotive rounds curves or passes over vertical irregularities in the roadbed of the railroad. This shaft section is provided with a bevel pinion 36 that meshes with a bevel gear 37 on the driving shaft or axle 22 of the truck at the rear, or axle 22' on the front truck. The gear and pinion and shaft section 35 are enclosed in a gear housing comprising the upper section 39 and lower section 38 which are bolted together in usual manner. The end bolster 19 of the truck is utilized to support this gear housing and to that end is fashioned with a pair of centrally located, spaced, perforated ears 40 between which a perforated lug 41 of the housing fits, and a bolt 42 is used to secure these parts together. The rear end bolster 20 is also provided with these perforated ears 40 in order that the end bolsters may be interchanged in case of breakage of parts.

Power may be supplied from a suitable source, here indicated as three vertical or upright engines 43, 44 and 45 located at the rear of the boiler and in convenient position to take steam therefrom, and forward of the cab 2 of the locomotive. The engines are disposed in a longitudinal line to the right of the longitudinal center of the locomotive and their piston rods 46 are shown as imparting power to the crank shaft 47 that extends longitudinally of the locomotive and is journaled in bearings 48 that are suitably supported.

The crank shaft is equipped with a low speed drive gear 49 and a higher speed gear 50 and these gears are designed to co-act with gears 51 and 52 on the central section 53 of the jack shaft or transmission shaft disposed along the longitudinal axis of the locomotive and journaled in bearings 54.

The front truck wheels are driven from the shaft 53 through a universal joint 55, sleeve 56, shaft section 57 and a second universal joint 58 to drive the front axle 23'.

The gears 51 and 52 on shaft 53 may be shifted by manipulation of the clutch spool 59 through yoke 60 and a suitable shift lever, to change the speed of the locomotive.

The power is transmitted from the central or main section 68 of the transmission shaft to the rear truck, driving axle 22 through a universal joint 61 and its sleeve 62 which telescopes over a polygonal slide shaft section 63, and this latter section is connected with a second universal joint 64 to which the pinion shaft 35 is also connected.

The universal joints 55, 58, 61 and 64, are of substantially the same construction and provide for the flexing of the transmission shaft, while the telescoping parts 56 and 57 adjacent the front truck and the complementary telescoping parts 62 and 63 adjacent the rear truck aid in flexing the shaft and at the same time provide for a continuous drive through the transmission shaft.

The details of construction of the universal joints are illustrated in Figures 5, 6 and 7 where the sections 35 and 63 are shown as connected by one of these joints. Each joint comprises a circular head 65 having in its face four L-shaped sockets 66, and these sockets are closed by means of a retaining ring 67 secured to the head by bolts 68.

The end of the section 35 is forked as at 69 and the adjoining end of the shaft section 63 is forked as at 70 and these forks are provided with bearing pins or journals 71 that are radially disposed with relation to the axes of the shaft sections. These pins are journaled in bearing blocks 72 located in the L-shaped sockets and each block is fashioned with a cam face 73 with which a wedge or cam block 74 co-acts when the set bolt 75 is turned to adjust the relation of the bearing block and cam block for adjusting the operating parts of the universal joint, and to take up the wear on the journals and pins.

When the wear becomes excessive the adjacent sides of the split journals may be milled or planed off to re-establish a tight bearing.

Having thus fully described my invention, what I claim as new and desire to secure by Letters Patent is—

In a geared locomotive the combination with spaced driving trucks and intermediate transmission shaft arranged to flex along the longitudinal axis of the locomotive, said trucks comprising side frames and end bolsters, double shackles joining the ends of the end bolsters and side frames, gear housings on the trucks and connections between said housings and said end bolsters.

In testimony whereof I affix my signature.

OSCAR C. HOPKINS.